(12) United States Patent
Li et al.

(10) Patent No.: US 11,824,697 B2
(45) Date of Patent: *Nov. 21, 2023

(54) METHOD, APPARATUS AND STORAGE MEDIUM FOR RECEIVING A PDCCH

(71) Applicant: Huawei Technologies Co., Ltd., Shenzhen (CN)

(72) Inventors: Sainan Li, Shenzhen (CN); Yalin Liu, Munich (DE); Huang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,313

(22) Filed: Feb. 7, 2022

(65) Prior Publication Data

US 2022/0322233 A1 Oct. 6, 2022

Related U.S. Application Data

(63) Continuation of application No. 16/786,085, filed on Feb. 10, 2020, now Pat. No. 11,272,452, which is a
(Continued)

(30) Foreign Application Priority Data

Aug. 11, 2017 (CN) .......................... 201710689638.4

(51) Int. Cl.
*H04L 27/26* (2006.01)
*H04W 52/02* (2009.01)
(Continued)

(52) U.S. Cl.
CPC ..... *H04L 27/2602* (2013.01); *H04W 52/0229* (2013.01); *H04W 72/044* (2013.01);
(Continued)

(58) Field of Classification Search
CPC .......... H04W 52/0229; H04W 72/042; H04W 72/044; H04W 72/048; H04W 4/06; H04W 56/00
See application file for complete search history.

(56) References Cited

U.S. PATENT DOCUMENTS

2009/0262693 A1 10/2009 Wang et al.
2009/0319903 A1 12/2009 Alanara
(Continued)

FOREIGN PATENT DOCUMENTS

CN 103378939 A 10/2013
CN 104219757 A 12/2014
(Continued)

OTHER PUBLICATIONS

3GPP TR 38.802 V1.0.0 (Nov. 2016), 3rd Generation Partnership Project; Technical Specification Group Radio Access Network; Study on New Radio (NR) Access Technology Physical Layer Aspects (Release 14), 64 pages.
(Continued)

*Primary Examiner* — Jael M Ulysse
(74) *Attorney, Agent, or Firm* — Slater Matsil, LLP (57) ABSTRACT

Embodiments of this application disclose a data receiving method, a data sending method, a data transmission method, and a related apparatus and system. The method includes: sending, by a network device in each transmission subwindow corresponding to a broadcast signal, the broadcast signal to user equipment by using a different antenna port, where the transmission subwindow is obtained by dividing, based on preset subwindow information, a transmission window corresponding to the broadcast signal; and determining, by the UE, a transmission subwindow in which a downlink transmit beam is located; and receiving the broadcast signal in a time in which the transmission subwindow is located, where the time in which the transmission sub-
(Continued)

window is located is calculated based on the pre-obtained subwindow information.

20 Claims, 4 Drawing Sheets

Related U.S. Application Data continuation of application No. PCT/CN2018/100307, filed on Aug. 13, 2018.

(51) Int. Cl.
H04W 72/044 (2023.01)
H04W 72/23 (2023.01)
H04W 72/51 (2023.01)

(52) U.S. Cl.
CPC ........... *H04W 72/23* (2023.01); *H04W 72/51* (2023.01); *H04L 27/2613* (2013.01)

(56) References Cited

U.S. PATENT DOCUMENTS

| | | | |
|---|---|---|---|
| 2012/0063370 A1 | 3/2012 | Worrall | |
| 2012/0163305 A1* | 6/2012 | Nimbalker | H04W 52/0206 370/329 |
| 2013/0301542 A1* | 11/2013 | Krishnamurthy | H04W 72/23 370/328 |
| 2015/0181543 A1* | 6/2015 | Hwang | H04W 56/001 370/336 |
| 2015/0181575 A1 | 6/2015 | Ng et al. | |
| 2015/0245323 A1* | 8/2015 | You | H04L 5/0053 370/329 |
| 2016/0021632 A1* | 1/2016 | Sun | H04W 56/001 370/350 |
| 2016/0088621 A1* | 3/2016 | Lee | H04W 4/70 370/336 |
| 2016/0301515 A1* | 10/2016 | Ouchi | H04W 72/21 |
| 2016/0301555 A1* | 10/2016 | Nory | H04L 5/001 |
| 2016/0353420 A1* | 12/2016 | You | H04B 7/2656 |
| 2017/0111886 A1* | 4/2017 | Kim | H04W 48/14 |
| 2017/0150461 A1* | 5/2017 | Li | H04L 27/2673 |
| 2017/0195888 A1* | 7/2017 | Gou | H04L 5/0007 |
| 2017/0251443 A1* | 8/2017 | Shin | H04W 72/23 |
| 2017/0251460 A1* | 8/2017 | Agiwal | H04B 7/0617 |
| 2017/0273058 A1* | 9/2017 | Agiwal | H04B 7/0617 |
| 2017/0294999 A1* | 10/2017 | Patel | H04L 5/0094 |
| 2017/0311342 A1* | 10/2017 | You | H04B 7/0695 |
| 2017/0331670 A1* | 11/2017 | Parkvall | H04W 24/10 |
| 2017/0367069 A1* | 12/2017 | Agiwal | H04W 68/005 |
| 2018/0324753 A1* | 11/2018 | Islam | H04W 68/02 |
| 2018/0324770 A1* | 11/2018 | Nogami | H04L 5/005 |
| 2018/0376501 A1* | 12/2018 | John Wilson | H04W 72/23 |
| 2020/0092846 A1* | 3/2020 | Deng | H04W 68/025 |

FOREIGN PATENT DOCUMENTS

| | | |
|---|---|---|
| CN | 104219767 A | 12/2014 |
| CN | 105072565 A | 11/2015 |
| CN | 106793058 A | 5/2017 |
| CN | 106879040 A | 6/2017 |
| JP | 2016535561 A | 11/2016 |
| KR | 20110008229 A | 1/2011 |
| WO | 2017069668 A1 | 4/2017 |

OTHER PUBLICATIONS

3GPP TR 38.912 V1.0.0 (Mar. 2017), 3rd Generation Partnership Project; Technical Specification Group Radio Access Network; Study on New Radio (NR) Access Technology (Release 14), 74 pages.
3GPP TSG RAN WG1 Meeting #88bis , R1-1705549: "Discussion on SS block transmission", Motorola Mobility, Lenovo, Apr. 3-7, 2017, 4 pages, Spokane, USA.
CATT, "Delivery of Other System Information", 3GPP TSG RAN WG1 NR Ad-Hoc#2, R1-1710030, Jun. 27-30, 2017, 3 pages, Qingdao, P.R.China.
Huawei et al., "Benefits of implicit soft combining for PBCH by Polar code construction", 3GPP TSG RAN WG1 NR Ad-Hoc#2 , R1-1710472, Jun. 27-30, 2017, 6 pages, Qingdao, China.
Ericsson, "SIB for Rel-13 low complexity and coverage enhanced UEs", 3GPP TSG-RAN WG2 #89bis, Tdoc R2-151553, Apr. 20-24, 2015, 8 pages, Bratislava, Slovakia.
Samsung, "System Information Signalling in NR", 3GPP TSG-RAN WG2 Meeting #93bis, R2-162215, Apr. 11-15, 2016, 7 pages, Dubrovnik, Croatia.
Xiaomi, "Discussion on the need of additional broadcast indication for On demand SI", 3GPP TSG-RAN WG2 #97, R2-1700996, Feb. 13-17, 2017, 2 pages, Athens, Greece.
Samsung, "SI Message TX/RX in NR", 3GPP TSG-RAN WG2 Meeting #98, R2-1704063, May 15-19, 2017, 4 pages, Hangzhou, China.
Samsung, SI Message TX/RX in N☆, 3GPP TSG-RAN WG2 NR#2, R2-1706529, Jun. 27-29, 2017, 4 pages, Qingdao, China.
Status Report to TSG, 3GPP TSG RAN meeting #74, RP-162201, Dec. 5-8, 2016, 148 pages, Vienna, Austria.
NTT Docomo, "Presentation of Specification/Report to TSG:TR 38.912, Version 1.0.0", 3GPP TSG RAN Meeting #75, Tdoc RP-170854, Mar. 6-9, 2017, 1 pages, Dubrovnik, Croatia.

* cited by examiner

FIG. 10

METHOD, APPARATUS AND STORAGE MEDIUM FOR RECEIVING A PDCCH

CROSS-REFERENCE TO RELATED APPLICATIONS

This application is a continuation of U.S. patent application Ser. No. 16/786,085, filed on Feb. 10, 2020, which is a continuation of International Application No. PCT/CN2018/100307, filed on Aug. 13, 2018. The International Application claims priority to Chinese Patent Application No. 201710689638.4, filed on Aug. 11, 2017. All of the aforementioned patent applications are hereby incorporated by reference in their entireties.

TECHNICAL FIELD

This application relates to the data processing field, and specifically, to a data receiving method, a data sending method, a data transmission method, and a related apparatus and system.

BACKGROUND

To meet a large-capacity requirement of a next-generation communications system, a high frequency band greater than 6 GHz is introduced to perform communication. Using high bandwidth and a high rate for data transmission in high frequency communication is exactly one of hotspot research technologies of a 5G communications system.

A narrow beam needs to be used for data transmission due to a high path loss of the high frequency communication, to ensure a propagation distance and a high beam gain. However, coverage of the data transmission performed using the narrow beam is limited. To ensure communication quality of UE in a cell, narrow beam alignment needs to be performed between a network device and the UE, to determine a downlink transmit beam, of the network device, corresponding to each UE in the cell.

Common information in the cell is sent by the network device in a form of a broadcast signal. When performing data transmission by using the narrow beam, the network device repeatedly sends the broadcast signal through omnidirectional beam scanning, to cover the entire cell, so that each UE in the cell can finally receive the broadcast signal.

However, when the common information is repeatedly sent in a corresponding transmission window through omnidirectional beam scanning, because the UE does not know a time in which a downlink transmit beam corresponding to the UE is located in the transmission window, the UE needs to monitor the entire transmission window, to receive the common information in the time in which the downlink transmit beam corresponding to the UE is located.

Because omnidirectional beam scanning for covering the entire cell usually takes a relatively long time, the corresponding transmission window also needs to occupy a relatively long time. However, the UE monitors the entire transmission window, but actually can receive the common information only in the time in which the downlink transmit beam corresponding to the UE is located, undoubtedly causing a waste of power consumption of the UE.

SUMMARY

Embodiments of this application provide a data receiving method, a data sending method, a data transmission method, and a related apparatus and system, to avoid a waste of power consumption of UE.

In view of this, embodiments of the present invention provide the following technical solutions.

According to a first aspect, this application provides a data receiving method, where the method includes: receiving, by user equipment UE, a synchronization signal block; and determining, based on the synchronization signal block, a transmission subwindow corresponding to a broadcast signal, where transmission subwindows are distributed in two or more adjacent transmission windows; and receiving the broadcast signal in the transmission subwindow.

In a possible implementation of the first aspect, the transmission subwindow corresponding to the broadcast signal is determined based on an index of the synchronization signal block.

In a possible implementation of the first aspect, the two or more adjacent transmission windows include n evenly distributed transmission subwindows, and n is a positive integer.

In a possible implementation of the first aspect, all of the n evenly distributed transmission subwindows have a same length.

In a possible implementation of the first aspect, a quantity of transmission subwindows is less than or equal to a quantity of synchronization signal blocks.

In a possible implementation of the first aspect, the determining, based on the synchronization signal block, a transmission subwindow corresponding to a broadcast signal includes: obtaining a location, in a transmission window, of the transmission subwindow corresponding to the broadcast signal.

In a possible implementation of the first aspect, the obtaining a location, in a transmission window, of the transmission subwindow corresponding to the broadcast signal includes: obtaining a start time of the transmission subwindow corresponding to the broadcast signal and a length of the transmission subwindow.

In a possible implementation of the first aspect, the length of the transmission subwindow is predefined.

In a possible implementation of the first aspect, the broadcast signal is used to transmit common information.

In a possible implementation of the first aspect, the receiving the broadcast signal in the transmission subwindow includes: receiving a physical downlink control channel PDCCH in the transmission subwindow.

In a possible implementation of the first aspect, the receiving the broadcast signal in the transmission subwindow includes: receiving one or more of the following in the transmission subwindow: remaining minimum information, other system information, and a paging message.

In a possible implementation of the first aspect, the synchronization signal block and the broadcast signal are received by using a same beam.

In a possible implementation of the first aspect, the transmission window further includes a remaining part of time, and the remaining part of time is not used to schedule or transmit the broadcast signal.

In a possible implementation of the first aspect, when one transmission window is insufficient to include all the transmission subwindows, the transmission subwindows are distributed in the at least two adjacent transmission windows.

According to a second aspect, this application provides a data receiving apparatus, where the data receiving apparatus includes a processor and a transceiver, where the transceiver is configured to receive a synchronization signal block; the processor is configured to determine, based on the synchronization signal block, a transmission subwindow corresponding to a broadcast signal, where transmission subwindows are distributed in two or more adjacent transmission windows; and the transceiver is further configured to receive the broadcast signal in the transmission subwindow.

In a first possible implementation of the second aspect, the processor is specifically configured to determine, based on an index of the synchronization signal block, the transmission subwindow corresponding to the broadcast signal.

In a first possible implementation of the second aspect, the two or more adjacent transmission windows include n evenly distributed transmission subwindows, and n is a positive integer.

In a first possible implementation of the second aspect, all of the n evenly distributed transmission subwindows have a same length.

In a first possible implementation of the second aspect, a quantity of transmission subwindows is less than or equal to a quantity of synchronization signal blocks.

In a first possible implementation of the second aspect, the processor is specifically configured to obtain a location, in a transmission window, of the transmission subwindow corresponding to the broadcast signal.

In a first possible implementation of the second aspect, in a process in which the processor obtains the location, in the transmission window, of the transmission subwindow corresponding to the broadcast signal, the processor is specifically configured to obtain a start time of the transmission subwindow corresponding to the broadcast signal and a length of the transmission subwindow.

In a first possible implementation of the second aspect, the length of the transmission subwindow is predefined.

In a first possible implementation of the second aspect, the broadcast signal is used to transmit common information.

In a first possible implementation of the second aspect, that the transceiver receives the broadcast signal in the transmission subwindow includes: receiving a physical downlink control channel PDCCH in the transmission subwindow.

In a first possible implementation of the second aspect, that the transceiver receives the broadcast signal in the transmission subwindow includes: receiving one or more of the following in the transmission subwindow: remaining minimum information, other system information, and a paging message.

In a first possible implementation of the second aspect, that the transceiver receives the broadcast signal in the transmission subwindow includes: receiving the synchronization signal block and the broadcast signal by using a same beam.

In a first possible implementation of the second aspect, the transmission window further includes a remaining part of time, and the remaining part of time is not used to schedule or transmit the broadcast signal.

In a first possible implementation of the second aspect, when one transmission window is insufficient to include all the transmission subwindows, the transmission subwindows are distributed in the at least two adjacent transmission windows.

According to a third aspect, this application provides a data sending method, where the method includes: determining a transmission subwindow corresponding to a broadcast signal, where transmission subwindows are distributed in two or more adjacent transmission windows; and sending a synchronization signal block; and sending the broadcast signal in the transmission subwindow corresponding to the synchronization signal block.

In a first possible implementation of the third aspect, an index of the synchronization signal block is used to determine the transmission subwindow corresponding to the broadcast signal.

In a first possible implementation of the third aspect, the two or more adjacent transmission windows include n evenly distributed transmission subwindows, and n is a positive integer.

In a first possible implementation of the third aspect, all of the n evenly distributed transmission subwindows have a same length.

In a first possible implementation of the third aspect, a quantity of transmission subwindows is less than or equal to a quantity of synchronization signal blocks.

In a first possible implementation of the third aspect, a location, in a transmission window, of the transmission subwindow corresponding to the broadcast signal is used to determine the transmission subwindow corresponding to the broadcast signal.

In a first possible implementation of the third aspect, the location, in the transmission window, of the transmission subwindow corresponding to the broadcast signal includes a start time of the transmission subwindow corresponding to the broadcast signal and a length of the transmission subwindow.

In a first possible implementation of the third aspect, the length of the transmission subwindow is predefined.

In a first possible implementation of the third aspect, the broadcast signal is used to transmit common information.

In a first possible implementation of the third aspect, the sending the broadcast signal in the transmission subwindow corresponding to the synchronization signal block includes: sending a physical downlink control channel PDCCH in the transmission subwindow.

In a first possible implementation of the third aspect, the sending the broadcast signal in the transmission subwindow corresponding to the synchronization signal block includes: sending one or more of the following in the transmission subwindow: remaining minimum information, other system information, and a paging message.

In a first possible implementation of the third aspect, the synchronization signal block and the broadcast signal are sent by using a same beam.

In a first possible implementation of the third aspect, the transmission window further includes a remaining part of time, and the remaining part of time is not used to schedule or transmit the broadcast signal.

In a first possible implementation of the third aspect, when one transmission window is insufficient to include all the transmission subwindows, the transmission subwindows are distributed in the at least two adjacent transmission windows.

According to a fourth aspect, this application provides a data sending apparatus, including a processor and a transceiver, where the processor is configured to determine a transmission subwindow corresponding to a broadcast signal, where transmission subwindows are distributed in two or more adjacent transmission windows; and the transceiver is configured to: send a synchronization signal block; and send the broadcast signal in the transmission subwindow corresponding to the synchronization signal block.

In a first possible implementation of the fourth aspect, an index of the synchronization signal block is used to determine the transmission subwindow corresponding to the broadcast signal.

In a first possible implementation of the fourth aspect, the two or more adjacent transmission windows include n evenly distributed transmission subwindows, and n is a positive integer.

In a first possible implementation of the fourth aspect, all of the n evenly distributed transmission subwindows have a same length.

In a first possible implementation of the fourth aspect, a quantity of transmission subwindows is less than or equal to a quantity of synchronization signal blocks.

In a first possible implementation of the fourth aspect, a location, in a transmission window, of the transmission subwindow corresponding to the broadcast signal is used to determine the transmission subwindow corresponding to the broadcast signal.

In a first possible implementation of the fourth aspect, the location, in the transmission window, of the transmission subwindow corresponding to the broadcast signal includes a start time of the transmission subwindow corresponding to the broadcast signal and a length of the transmission subwindow.

In a first possible implementation of the fourth aspect, the length of the transmission subwindow is predefined.

In a first possible implementation of the fourth aspect, the broadcast signal is used to transmit common information.

In a first possible implementation of the fourth aspect, in a process of sending the broadcast signal in the transmission subwindow corresponding to the synchronization signal block, the transceiver is specifically configured to send a physical downlink control channel PDCCH in the transmission subwindow.

In a first possible implementation of the fourth aspect, that the transceiver sends the broadcast signal in the transmission subwindow corresponding to the synchronization signal block includes: sending one or more of the following in the transmission subwindow: remaining minimum information, other system information, and a paging message.

In a first possible implementation of the fourth aspect, the transceiver sends the synchronization signal block and the broadcast signal by using a same beam.

In a first possible implementation of the fourth aspect, the transmission window further includes a remaining part of time, and the remaining part of time is not used to schedule or transmit the broadcast signal.

In a first possible implementation of the fourth aspect, when one transmission window is insufficient to include all the transmission subwindows, the transmission subwindows are distributed in the at least two adjacent transmission windows.

According to a fifth aspect, this application provides a data transmission method, where the method includes: dividing, by a network device based on preset subwindow information, a transmission window corresponding to a broadcast signal into transmission subwindows, and sending, in each transmission subwindow, the broadcast signal to user equipment UE by using a different antenna port.

In this application, the network device sends the broadcast signal in each transmission subwindow by using a different antenna port, so that after determining a transmission subwindow in which a downlink transmit beam is located, the UE can receive the broadcast signal only in a time in which the transmission subwindow is located, thereby avoiding a waste of power consumption of the UE.

In a first possible implementation of the fifth aspect, after determining a quantity of different antenna ports required for covering a cell of the UE, the network device may evenly divide the transmission window into transmission subwindows whose quantity is the quantity of different antenna ports.

In a second possible implementation of the fifth aspect, the network device sequentially and consecutively divides the transmission window into transmission subwindows based on a subwindow length and a start time in the preset subwindow information, and a quantity of obtained transmission subwindows can be used to cover a cell of the UE.

With reference to the second possible implementation of the fifth aspect, in a third possible implementation of the fifth aspect, when one transmission window is insufficient to be divided into a quantity of transmission subwindows required for covering the cell of the UE, the network device may divide at least two adjacent transmission windows into transmission subwindows, to complete transmission subwindow division.

With reference to the third possible implementation of the fifth aspect, in a fourth possible implementation of the fifth aspect, the network device divides a first transmission window and a second transmission window that are adjacent into transmission subwindows. To fully use a transmission time, the transmission subwindows obtained through division may include a transmission subwindow that is obtained by concatenating a remaining part of time of the first transmission window and a start part of time of the second transmission window.

In a fifth possible implementation of the fifth aspect, because a synchronization signal block set may include synchronization signal blocks sent by using downlink transmit beams that are different or some of which are the same or that are all the same, a quantity of transmission subwindows is less than or equal to a quantity of synchronization signal blocks in the synchronization signal block set.

With reference to any one of the possible implementations of the fifth aspect, in a sixth possible implementation of the fifth aspect, the broadcast signal includes remaining minimum system information RMSI, other system information OSI, or a paging message.

According to a sixth aspect, this application provides a data transmission method, where the method includes: determining, by user equipment UE in one or more transmission subwindows obtained by dividing a transmission window corresponding to a preset broadcast signal, a transmission subwindow in which a downlink transmit beam corresponding to the UE is located, and calculating, based on pre-obtained subwindow information, a time in which the transmission subwindow is located, so that the UE receives the broadcast signal in the time.

In this application, the UE can calculate, in advance based on the subwindow information, the time of the transmission subwindow in which the downlink transmit beam is located, and receive the broadcast signal only in the time in which the transmission subwindow is located. The UE may not need to monitor the entire transmission window, thereby avoiding a waste of power consumption of the UE.

In a first possible implementation of the sixth aspect, the broadcast signal includes a synchronization signal block, a synchronization signal block set includes synchronization signal blocks sent by using different downlink transmit beams, each synchronization signal block has an index, and the UE may detect the synchronization signal block set, to obtain an index of a synchronization signal block sent by using the downlink transmit beam of the UE. Further, the UE may determine, based on a preset correspondence between an index of a synchronization signal block and a transmission subwindow, a transmission subwindow corresponding to the index of the synchronization signal block, and finally use the transmission subwindow as the transmission subwindow in which the downlink transmit beam is located.

With reference to the implementation of the sixth aspect, in a second possible implementation of the sixth aspect, the subwindow information pre-obtained by the UE includes a subwindow length and a start time, and the subwindow length and the start time may be predefined in a protocol. The UE may obtain a location relationship between the transmission window and the transmission subwindow in which the downlink transmit beam is located, for example, a ranking of the transmission subwindow in the transmission window, and calculate, based on the location relationship, the subwindow length, and the start time, the time in which the transmission subwindow is located.

With reference to the second possible implementation of the sixth aspect, in a third possible implementation of the sixth aspect, the subwindow length pre-obtained by the UE may be delivered by a base station.

According to a seventh aspect, this application provides a data transmission apparatus, where the apparatus includes a sending module, configured to send, in each transmission subwindow corresponding to a broadcast signal, the broadcast signal to UE by using a different antenna port, where the transmission subwindow is obtained by dividing, based on preset subwindow information, a transmission window corresponding to the broadcast signal.

In a first possible implementation of the seventh aspect, the transmission subwindow is obtained by evenly dividing the transmission window.

In a second possible implementation of the seventh aspect, the subwindow information includes a subwindow length and a start time, and the transmission subwindow is obtained by sequentially and consecutively dividing the transmission window based on the subwindow length and the start time.

With reference to the second possible implementation of the seventh aspect, in a third possible implementation of the seventh aspect, the transmission subwindow is obtained by dividing at least two adjacent transmission windows.

With reference to the third possible implementation of the seventh aspect, in a fourth possible implementation of the seventh aspect, the at least two adjacent transmission windows include a first transmission window and a second transmission window, and the transmission subwindow includes a transmission subwindow that is obtained by concatenating a remaining part of time of the first transmission window and a start part of time of the second transmission window.

In a fifth possible implementation of the seventh aspect, a quantity of transmission subwindows is less than or equal to a quantity of synchronization signal blocks in a synchronization signal block set.

With reference to any one of the possible implementations of the seventh aspect, in a sixth possible implementation of the seventh aspect, the broadcast signal includes remaining minimum system information RMSI, other system information OSI, or a paging message.

According to an eighth aspect, this application provides a data transmission apparatus, where the apparatus includes: a first determining module, configured to determine a transmission subwindow in which a downlink transmit beam is located, where the transmission subwindow is obtained by dividing a transmission window corresponding to a preset broadcast signal; and a receiving module, configured to receive the broadcast signal in a time in which the transmission subwindow is located, where the time in which the transmission subwindow is located is calculated based on pre-obtained subwindow information.

In a first possible implementation of the eighth aspect, the broadcast signal includes a synchronization signal block, and the first determining module includes: a first obtaining module, configured to detect a synchronization signal block set, to obtain an index of a synchronization signal block sent by using the downlink transmit beam, where the synchronization signal block set includes synchronization signal blocks sent by using different downlink transmit beams, and each synchronization signal block has an index; and a second determining module, configured to: determine, based on a preset correspondence between an index of a synchronization signal block and a transmission subwindow, a transmission subwindow corresponding to the index of the synchronization signal block, and use the transmission subwindow as the transmission subwindow in which the downlink transmit beam is located.

With reference to the implementation of the eighth aspect, in a second possible implementation of the eighth aspect, the subwindow information includes a subwindow length and a start time, and the apparatus further includes: a second obtaining module, configured to obtain a location relationship between the transmission window and the transmission subwindow in which the downlink transmit beam is located; and a calculation module, configured to calculate, based on the location relationship, the subwindow length, and the start time, the time in which the transmission subwindow is located.

With reference to the second possible implementation of the eighth aspect, in a third possible implementation of the eighth aspect, the subwindow length is delivered by a base station.

According to a ninth aspect, this application provides a data transmission system, where the system includes a network device and UE, where the network device is configured to send, in each transmission subwindow corresponding to a broadcast signal, the broadcast signal to the UE by using a different antenna port, where the transmission subwindow is obtained by dividing, based on preset subwindow information, a transmission window corresponding to the broadcast signal; and the UE is configured to: determine a transmission subwindow in which a downlink transmit beam is located, and receive the broadcast signal in a time in which the transmission subwindow is located, where the transmission subwindow is obtained by dividing the transmission window corresponding to the broadcast signal, and the time in which the transmission subwindow is located is calculated based on the pre-obtained subwindow information.

In this application, the network device divides the transmission window corresponding to the broadcast signal into transmission subwindows, and sends the broadcast signal in each transmission subwindow by using a different antenna port, so that after determining the transmission subwindow in which the downlink transmit beam is located, the UE can receive the broadcast signal only in the time in which the transmission subwindow is located, thereby avoiding a waste of power consumption of the UE.

According to a tenth aspect, this application provides a network device, where the network device includes a receiver, a transmitter, a memory, and a processor, the memory stores an instruction, and when the processor executes the instruction, the transmitter is configured to send, in each transmission subwindow corresponding to a broadcast signal, the broadcast signal to user equipment UE by using a different antenna port, where the transmission subwindow is obtained by dividing, based on preset subwindow information, a transmission window corresponding to the broadcast signal.

In a first possible implementation of the tenth aspect, the transmission subwindow is obtained by evenly dividing the transmission window.

In a second possible implementation of the tenth aspect, the subwindow information includes a subwindow length and a start time, and the transmission subwindow is obtained by sequentially and consecutively dividing the transmission window based on the subwindow length and the start time.

With reference to the second possible implementation of the tenth aspect, in a third possible implementation of the tenth aspect, the transmission subwindow is obtained by dividing at least two adjacent transmission windows.

With reference to the third possible implementation of the tenth aspect, in a fourth possible implementation of the tenth aspect, the at least two adjacent transmission windows include a first transmission window and a second transmission window, and the transmission subwindow includes a transmission subwindow that is obtained by concatenating a remaining part of time of the first transmission window and a start part of time of the second transmission window.

In a fifth possible implementation of the tenth aspect, a quantity of transmission subwindows is less than or equal to a quantity of synchronization signal blocks in a synchronization signal block set.

With reference to any one of the possible implementations of the tenth aspect, in a sixth possible implementation of the tenth aspect, the broadcast signal includes remaining minimum system information RMSI, other system information OSI, or a paging message.

According to an eleventh aspect, this application provides user equipment, where the user equipment includes a memory, a processor, and a transceiver, where the memory is configured to: store program code, and transmit the program code to the processor; the processor is configured to determine a transmission subwindow in which a downlink transmit beam is located, where the transmission subwindow is obtained by dividing a transmission window corresponding to a preset broadcast signal; and the transceiver is configured to receive the broadcast signal in a time in which the transmission subwindow is located, where the time in which the transmission subwindow is located is calculated based on pre-obtained subwindow information.

In a first possible implementation of the eleventh aspect, the broadcast signal includes a synchronization signal block; and the processor is specifically configured to: detect a synchronization signal block set, to obtain an index of a synchronization signal block sent by using the downlink transmit beam, where the synchronization signal block set includes synchronization signal blocks sent by using different downlink transmit beams, and each synchronization signal block has an index; determine, based on a preset correspondence between an index of a synchronization signal block and a transmission subwindow, a transmission subwindow corresponding to the index of the synchronization signal block; and use the transmission subwindow as the transmission subwindow in which the downlink transmit beam is located.

With reference to the implementation of the eleventh aspect, in a second possible implementation of the eleventh aspect, the subwindow information includes a subwindow length and a start time; and the processor is further configured to: obtain a location relationship between the transmission window and the transmission subwindow in which the downlink transmit beam is located, and calculate, based on the location relationship, the subwindow length, and the start time, the time in which the transmission subwindow is located.

With reference to the second possible implementation of the eleventh aspect, in a third possible implementation of the eleventh aspect, the subwindow length is delivered by a base station.

According to a twelfth aspect, this application provides a data sending apparatus, configured to perform the method according to the third aspect and/or the fifth aspect.

According to a thirteenth aspect, this application provides a data receiving apparatus, configured to perform the method according to the first aspect and/or the sixth aspect.

According to a fourteenth aspect, this application provides a computer readable storage medium, including an instruction, where when the instruction is run on a computer, the computer is enabled to perform the method performed by the foregoing network device.

According to a fifteenth aspect, this application provides a computer program product including an instruction, where when the instruction is run on a computer, the computer is enabled to perform the method performed by the foregoing user equipment.

It can be learned from the foregoing technical solutions that this application has the following advantages:

The network device divides the transmission window corresponding to the broadcast signal into transmission subwindows in advance based on the subwindow information, and sends the broadcast signal in each transmission subwindow by using a different antenna port. Therefore, after determining the transmission subwindow in which the downlink transmit beam of the UE is located, the UE may calculate, based on the subwindow information, the time in which the transmission subwindow is located, and receive the broadcast signal only in the time, so that the UE may not need to monitor the entire transmission window, thereby avoiding a waste of power consumption of the UE.

DETAILED DESCRIPTION OF ILLUSTRATIVE EMBODIMENTS

A narrow beam needs to be used for data transmission in high frequency communication due to a high path loss of the high frequency communication, to ensure a transmission distance and a high beam gain. However, coverage of the data transmission performed by using the narrow beam is limited. Therefore, to ensure communication quality of each UE in a cell, a network device repeatedly sends a broadcast signal through omnidirectional beam scanning, to cover the entire cell.

Before the broadcast signal is repeatedly sent through omnidirectional beam scanning, narrow beam alignment needs to be performed between the network device and the UE, to determine a downlink transmit beam, of the network device, corresponding to each UE in the cell. However, the network device repeatedly sends the broadcast signal in a transmission window in the beam scanning manner, and the UE does not know a time in which a downlink transmit beam corresponding to the UE is located in the transmission window. Therefore, the UE can receive, only by monitoring the entire transmission window, the broadcast signal in the time in which the downlink transmit beam corresponding to the UE is located. Because the entire transmission window occupies a relatively long time, monitoring the entire transmission window by the UE undoubtedly wastes power consumption. The transmission window may be a period of time used by the UE to detect or receive a downlink signal, for example, the broadcast signal. A length of the transmission window may be, for example, 5 milliseconds, 10 milliseconds, 20 milliseconds, or 40 milliseconds. For another example, the transmission window may be one or more slots or one or more frames, for example, may be one slot, two slots, four slots, five slots, eight slots, 16 slots, a half frame, one frame, two frames, or four frames.

Based on this, this application provides a data transmission method. Specifically, a network device divides a transmission window into a preset quantity of transmission subwindows in advance, and sends, in each transmission subwindow, a broadcast signal to UE in a target cell by using a different antenna port, to cover the entire target cell. The UE pre-determines a transmission subwindow in which a downlink transmit beam corresponding to the UE is located, and calculates a time in which the transmission subwindow is located, so as to receive the broadcast signal in the time. In this application, each UE may not need to monitor the entire transmission window, but may receive the broadcast signal in a determined time, thereby avoiding a waste of power consumption. The transmission subwindow may be one or more symbols or one or more slots. For example, the transmission subwindow may be one symbol, two symbols, three symbols, four symbols, seven symbols, one slot, two slots, four slots, five slots, or eight slots.

The network device may be any device with a wireless transceiving function. The network device includes but is not limited to a network device (for example, a network device NodeB, an evolved network device eNodeB, a network device (gNB) in a fifth generation (5G) communications system, a network device or a network device in a future communications system, or an access node, a wireless relay node, or a wireless backhaul node in a Wi-Fi system), and the like. Alternatively, the network device may be a radio controller in a cloud radio access network (C-RAN) scenario. Alternatively, the network device may be a network device in a 5G network or a network device in a future evolved network, or may be a wearable device, an in-vehicle device, or the like. Alternatively, the network device may be a small cell, a transmission/reception point (TRP), or the like. Certainly, this application is not limited thereto.

Figure 1:
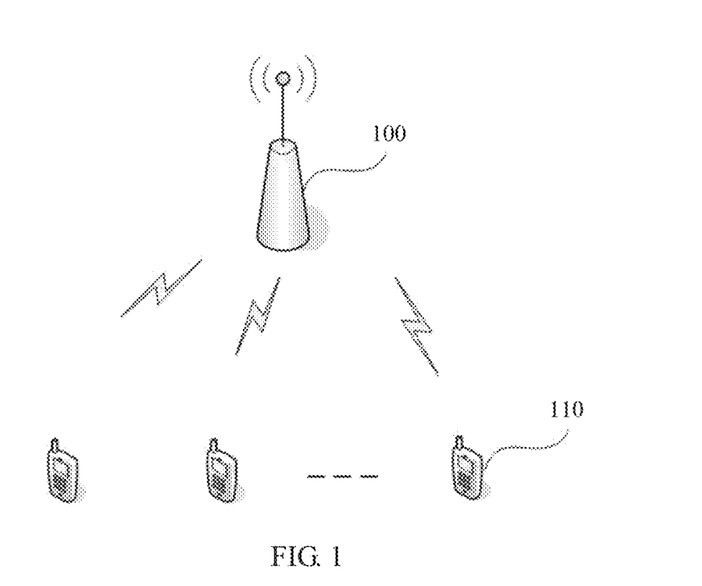
FIG. 1 is a schematic diagram of an application scenario of a data transmission method.

FIG. 1 is a schematic diagram of an application scenario of a data transmission method according to an embodiment of this application. A network device is specifically a base station 100. Before sending any broadcast signal to UEs 110 in a target cell, the base station 100 divides in advance a transmission window corresponding to the broadcast signal into a preset quantity of transmission subwindows, and sends the broadcast signal to the UEs 110 in the target cell by using different antenna ports, to cover the target cell.

It should be noted that in this embodiment of this application, the base station may send the broadcast signal through omnidirectional beam scanning, so that all the UEs in the target cell can receive the signal.

In addition, a channel of a symbol transmitted by using an antenna port may be inferred from a channel of another symbol transmitted by using the same antenna port. Therefore, a same beam may be used for a same antenna port. Therefore, in this embodiment of this application, that the base station 100 sends the broadcast signal to the UEs 110 in the target cell by using different antenna ports may also mean that the base station 100 sends the broadcast signal to the UEs 110 in the target cell by using different beams.

Before receiving the broadcast signal from the base station 100, the UE 110 in the target cell pre-determines a transmission subwindow in which a downlink transmit beam corresponding to the UE 110 is located, and calculates, based on pre-obtained subwindow information, a time in which the transmission subwindow is located. Because the UE 110 can determine a time in which the downlink transmit beam corresponding to the UE 110 is located, the UE 110 may not need to monitor the entire transmission window, but may receive the broadcast signal in the determined time, thereby avoiding a waste of power consumption.

In an implementation, the broadcast signal may be transmitted by using a beam the same as a beam of a synchronization signal block (SS block or SSB). The beam of the SS block is usually a relatively wide beam in narrow beams, and can implement relatively reliable transmission. In addition, the entire cell can be covered by using a relatively small quantity of beams. Therefore, the beam of the SS block may be used to transmit the broadcast signal (for example, system information or a paging message), to achieve relatively high reliability and relatively low overheads.

The UE 110 may detect a synchronization signal block set, to obtain an index of a synchronization signal block sent by using the downlink transmit beam corresponding to the UE 110. The synchronization signal block set may include synchronization signal blocks sent by the base station 100 by using different downlink transmit beams. To be specific, different beams have a correspondence with different synchronization signal blocks. Because each synchronization signal block has an index, namely, an SS block index, different beams have a correspondence with different SS block indexes. Specifically, the SS block index indicates a ranking of the SS block in the synchronization signal block set. In this embodiment of this application, a correspondence between an SS block index and a transmission subwindow is preset. After determining the SS block index of the synchronization signal block sent by using the downlink transmit beam corresponding to the UE 110, the UE 110 determines, based on the preset correspondence between the SS block index and the transmission subwindow, a transmission subwindow corresponding to the SS block index, namely, the transmission subwindow in which the downlink transmit beam corresponding to the UE 110 is located.

After determining the transmission subwindow in which the downlink transmit beam corresponding to the UE 110 is located, the UE 110 calculates, based on the pre-obtained subwindow information, the time in which the transmission subwindow is located. Specifically, the subwindow information may include a subwindow length and a start time. The subwindow length is used to indicate a length of a transmission subwindow. It should be noted that transmission subwindows in a same transmission window have a same length. Specifically, the subwindow length may be preset in a communication protocol between the base station 100 and the UE 110, or may be delivered in advance by the base station 100 to the UE 110. The start time in the subwindow information may also be a start time of the entire transmission window. For example, a start time of the first transmission subwindow in the transmission window is the same as the start time of the transmission window.

First, the UE 110 obtains a location relationship between the transmission window and the transmission subwindow in which the downlink transmit beam corresponding to the UE 110 is located. The location relationship is specifically a ranking of the transmission subwindow in the transmission window. Second, the UE 110 calculates, based on the location relationship, the subwindow length, and the start time of the entire transmission window, the time in which the transmission subwindow is located.

Specifically, the UE 110 may calculate a start time of the transmission subwindow by using the following formula (1):

$$P=O+\text{window index}*\text{Scheduling length} \qquad (1),$$

where P indicates the start time of the transmission subwindow, O indicates the start time of the entire transmission window, window indexes corresponding to n transmission subwindows in the transmission window are respectively 0, 1, ..., and n−1, and the scheduling length indicates the subwindow length, where n is a positive integer.

In addition, after calculating the start time of the transmission subwindow, the UE 110 determines, based on the subwindow length, an entire time in which the transmission subwindow is located. Finally, the UE 110 receives the broadcast signal in the time in which the transmission subwindow is located.

In actual application, the quantity of transmission subwindows may be a quantity of different antenna ports required for covering the cell in which the UE is located. In addition, the synchronization signal blocks (SS block) in the synchronization signal block set may be sent by using a same beam. In other words, the synchronization signal block set may include synchronization signal blocks sent by using different downlink transmit beams, or may include synchronization signal blocks sent by using downlink transmit beams some of which are the same, or may include synchronization signal blocks sent by using downlink transmit beams that are all the same. Therefore, the quantity of transmission subwindows is actually less than or equal to a quantity of synchronization signal blocks in the synchronization signal block set. An example in which the quantity n of transmission subwindows is less than a quantity M of synchronization signal blocks in the synchronization signal block set is used for description. When the quantity n of transmission subwindows is less than the quantity M of synchronization signal blocks in the synchronization signal block set, the correspondence between each transmission subwindow and an SS block index (it means that a transmission subwindow and an SS block that are sent by using a same beam) may be notified by the base station to the UE, or may be a correspondence predefined by the UE and the base station by using a protocol, or may be a correspondence, which is used by the UE by default, between transmission subwindows and indexes of N SS blocks, for example, the first N SS block indexes or the last N SS block indexes, in the M SS blocks. The quantity of transmission subwindows may also be notified by the base station to the UE by using signaling. For example, the base station may notify the quantity of transmission subwindows to the UE by using signaling such as EMSI information that is specifically carried in a physical broadcast channel (PBCH), remaining minimum system information RMSI, a Radio Resource Control (RRC) message, a MAC control element (MAC CE), or downlink control information DCI).

In this embodiment of this application, the broadcast signal may be used to transmit various types of common information, for example, system information, in the cell. The system information specifically includes remaining minimum system information (RMSI), and other system information (OSI). Alternatively, the common information may be a paging message, or the like. In this embodiment of this application, transmission of the OSI is used as an example for description.

Specifically, each system information message SI message) used to transmit the OSI has a corresponding transmission window. The corresponding transmission window is referred to as a system information window (SI-window) below. Different SI messages may be mapped to a same SI-window, or may be mapped to different SI-windows. SI-windows corresponding to different SI messages may overlap (where specifically, sometime-frequency resources overlap) or may not overlap. System information radio network temporary identifiers (SI-RNTI) corresponding to different SI messages may be the same or may be different. This is not limited herein.

In this embodiment of this application, the network device may divide the SI-window into a preset quantity of transmission subwindows in a plurality of manners, to send the SI message through omnidirectional beam scanning. Details are provided below.

Figure 2:
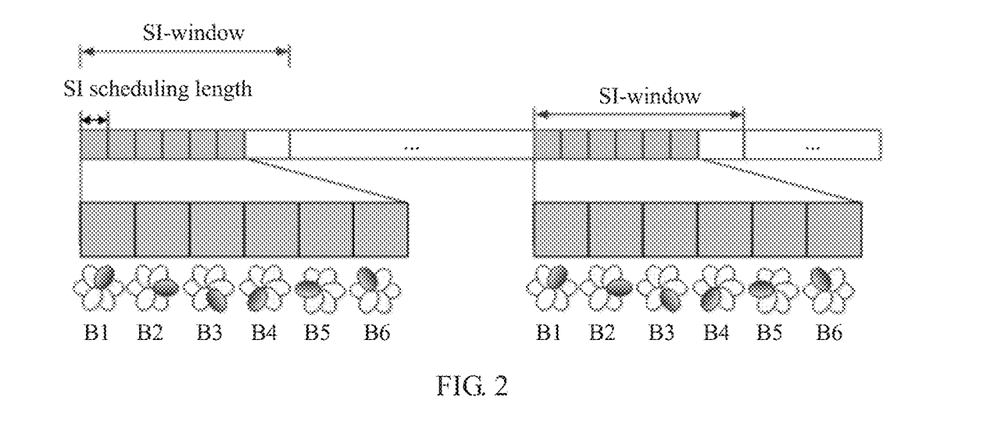
FIG. 2 is a schematic diagram of dividing an SI-window into transmission subwindows by a network device.

FIG. 2 is a schematic diagram of dividing an SI-window into transmission subwindows by a network device according to an embodiment of this application. To cover a target cell, the network device needs to send an SI message by using n (where n=6) beams in different directions. Therefore, the network device sequentially and consecutively divides the SI-window into n transmission subwindows based on pre-obtained subwindow information, and separately sends the SI message in the transmission subwindows by using the beams in different directions, to implement full coverage of the target cell. Specifically, the network device sequentially and consecutively obtains six transmission subwindows through division by using a start time of the SI-window as a start time for transmission subwindow division and by using a pre-obtained subwindow length, namely, an SI scheduling length, as a length of each transmission subwindow.

In an actual application, a synchronization signal block set includes SS blocks whose quantity is the same as a quantity of transmission subwindows. The n beams used by the network device and transmit beams of the SS blocks included in the synchronization signal block set may be the same or quasi co-located (QCL). A QCL parameter includes at least one of the following: an average gain average gain, an average delay average delay, delay spread delay spread, a Doppler shift Doppler shift, Doppler spread Doppler spread, and a spatial transmit/receive spatial Tx/Rx parameter. The spatial Tx/Rx parameter includes an angle of arrival (AoA)/angle of departure (AoD), a dominant AoA/AoD, an average AoA/AoD, a power angular spectrum (PAS) of the AoA/AoD, transmit/receive channel correlation, transmit/receive beamforming, spatial channel correlation, and the like.

In addition, an omnidirectional beam scanning sequence may be the same as a scanning sequence of the SS blocks in the synchronization signal block set, to be specific, SS block indexes are 0, 1, . . . , and n−1; or an omnidirectional beam scanning sequence may be corresponding to a scanning sequence of the SS blocks in the synchronization signal block set according to a preset rule, to be specific, SS block indexes are corresponding to 0, 1, . . . , and n−1 according to the preset rule. UE detects the synchronization signal block set to obtain an index of a synchronization signal block for which a downlink transmit beam corresponding to the UE is used as a transmit beam, and detects the scanning sequence of the synchronization signal blocks in the synchronization signal block set to obtain a transmission subwindow corresponding to the index of the synchronization signal block and use the transmission subwindow as a transmission subwindow in which the downlink transmit beam corresponding to the UE is located. Finally, the UE calculates, based on the pre-obtained subwindow information, a time in which the transmission subwindow is located, and receives the SI message in the time.

In addition, in this embodiment of this application, the UE may calculate the start time of the SI-window based on scheduling information of the SI message in minimum system information (MSI). The scheduling length of the SI message may be predefined in a protocol, or the scheduling length of the SI message may be notified by the network device to each UE. For example, the scheduling length of the SI message may be carried in the minimum system information (MSI) such as RMSI, or the scheduling length of the SI message may be carried in a response message of an SI request. Specifically, when the SI request is sent by using a MSG 1 in a random access procedure, the response message is a MSG 2; or when the SI request is sent by using a MSG 3 in a random access procedure, the response message is a MSG 4.

It should be noted that scheduling lengths of SI messages may be the same or may be different. When the RMSI carries the scheduling length of the SI message, the scheduling length is configurable. In other words, the scheduling length may or may not exist in the RMSI. When the scheduling length is not configured in the RMSI, the network device may send the SI message in the SI-window based on a current value of the scheduling length, and the UE may receive the SI message in the SI-window based on the current value of the scheduling length; or if the scheduling length is configured in the RMSI, the network device may send the SI message in the SI-window based on the configured scheduling length, and the UE may receive the SI message in the SI-window based on the configured scheduling length.

As shown in FIG. 2, mapping to the n transmission subwindows starts to be sequentially and consecutively performed from the start time of the SI-window. The network device sends, to the UE in a specified beam direction in each transmission subwindow whose length is equal to the scheduling length in the SI-window, a physical downlink control channel (PDCCH) for scheduling the SI message. The UE may read, based on an indication in the PDCCH, an SI message, at a corresponding resource location, carried in a physical downlink shared channel (PDSCH). A PDSCH resource indicated by the PDCCH may not necessarily be in the transmission subwindow. The UE only needs to blindly detect a corresponding PDCCH in the time in which the determined transmission subwindow is located, thereby reducing power consumption of detection performed by the UE.

Figure 3:
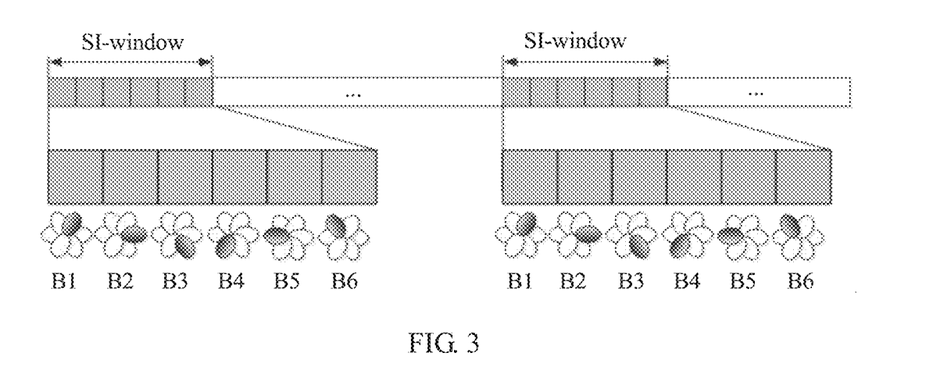
FIG. 3 is another schematic diagram of dividing an SI-window into transmission subwindows by a network device.

FIG. 3 is another schematic diagram of dividing an SI-window into transmission subwindows by a network device according to an embodiment of this application. Specifically, the network device may evenly divide the SI-window in time domain based on a quantity n of beams required for covering an entire cell, to obtain n transmission subwindows. A scheduling length of an SI message does not need to be defined, and may be obtained by dividing duration of the SI-window by a quantity of transmission subwindows. As shown in FIG. 3, the network device evenly divides the SI-window into six transmission subwindows, and duration of each transmission subwindow is obtained by dividing the duration of the SI-window by 6. It can be learned that all the transmission subwindows are evenly distributed in the transmission window. For example, all the transmission subwindows have a same length. A time interval between start locations of every two adjacent transmission subwindows remains the same.

In an actual application, a manner of transmitting the SI message by the network device and UE in each transmission subwindow obtained through division in FIG. 3 is the same as a manner of transmitting the SI message in each transmission subwindow obtained through division in FIG. 2, and details are not described herein again.

In addition, in an application scenario, if the entire cell cannot be covered through omnidirectional beam scanning performed in one SI-window, to be specific, if n transmission subwindows are required for performing omnidirectional beam scanning to cover the entire cell, but one SI-window cannot be divided into n transmission subwindows whose lengths are a required scheduling length, two or more adjacent SI-windows are required for covering the entire cell.

Figure 4:
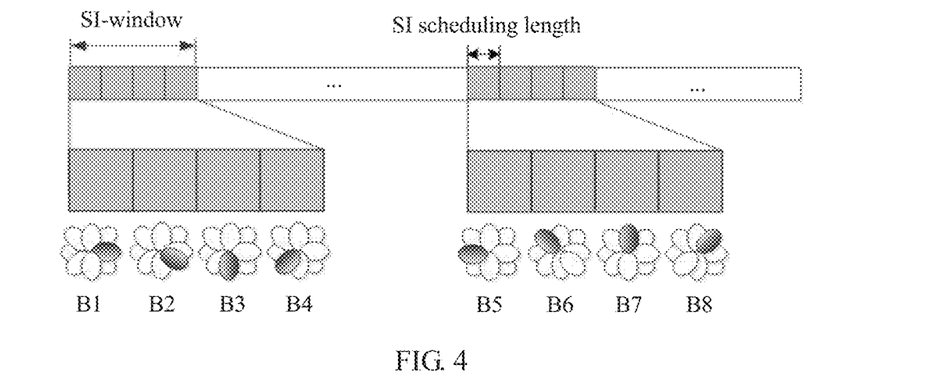
FIG. 4 is a schematic diagram of dividing two SI-windows into transmission subwindows by a network device.

FIG. 4 is a schematic diagram of dividing two SI-windows into transmission subwindows by a network device according to an embodiment of this application. The network device evenly divides the two SI-windows into eight transmission subwindows, and separately sends an SI message to UEs by using eight different beams, to cover an entire cell. The UE determines a transmission subwindow in which a downlink transmit beam corresponding to the UE is located, namely, a ranking of the transmission subwindow in a specific SI-window, calculates, based on a pre-obtained scheduling length and a start time of the SI-window, a time in which the transmission subwindow is located, and finally receives the SI message in the time, thereby avoiding a waste of detection power consumption.

Figure 5:
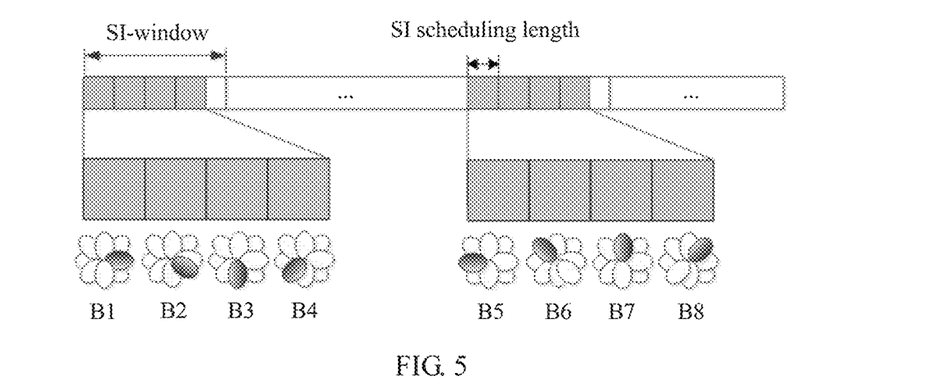
FIG. 5 is another schematic diagram of dividing two SI-windows into transmission subwindows by a network device.

In addition, if a length of the SI-window is not an integer multiple of the preset scheduling length, the network device cannot evenly divide the SI-window. FIG. 5 is another schematic diagram of dividing two SI-windows into transmission subwindows by a network device according to an embodiment of this application. The network device sequentially and consecutively divides a first transmission window and a second transmission window that are adjacent into transmission subwindows. After division of the first transmission window is completed, there is a remaining part of time in the first transmission window because a length of the SI-window is not an integer multiple of a scheduling length. The network device may not use the remaining part of time that is not an integer multiple of the scheduling length to schedule or transmit an SI message, but continue to divide the second transmission window into transmission subwindows, to finally obtain the transmission subwindows obtained by dividing the two SI-windows.

Figure 6:
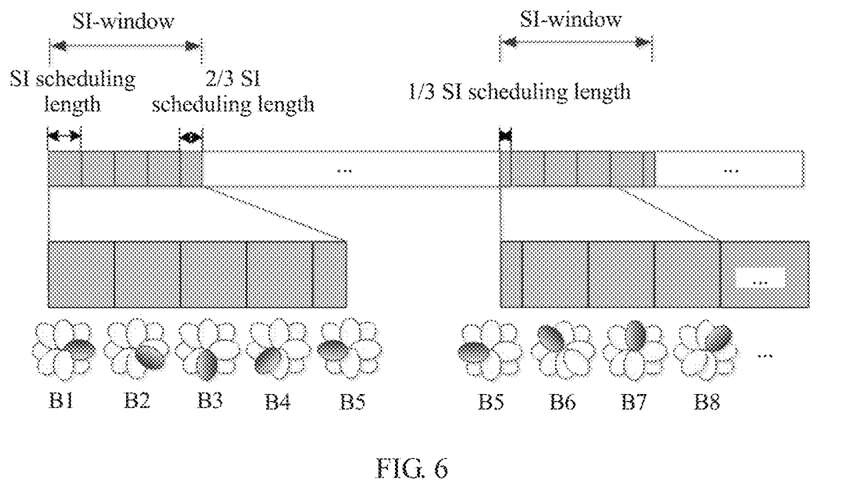
FIG. 6 is another schematic diagram of dividing two SI-windows into transmission subwindows by a network device.

In addition, to fully use a time in an SI-window for data transmission, an embodiment of this application further provides a schematic diagram of dividing two SI-windows into transmission subwindows by a network device, as shown in FIG. 6. After the network device completes division of a first transmission window, a time whose length is ⅔ scheduling length is left. In this case, the network device may concatenate, into one transmission subwindow, the remaining part of time (for example, ⅔ scheduling length) that is not an integer multiple of the scheduling length in the first transmission window and a start part of time (for example, ⅓ scheduling length) in a next SI-window, namely, a second transmission window, and then continue to complete division of a subsequent time in the second transmission window into transmission subwindows, to finally obtain the transmission subwindows obtained by dividing the two SI-windows.

It should be noted that, because neither RMSI nor a paging message can be transmitted in two transmission windows, transmission subwindow division manners in FIG. 4, FIG. 5, and FIG. 6 are usually not applicable to transmission of the RMSI or the paging message. In addition, when the RMSI and the paging message are transmitted in a transmission subwindow shown in FIG. 2, a scheduling length of a transmission subwindow used to transmit the RMSI may be predefined in a protocol, and a scheduling length of a transmission subwindow used to transmit the paging message may be predefined in a protocol or may be notified by a base station to UE. For example, the scheduling length of the transmission subwindow used to transmit the paging message is carried in the RMSI and is notified to a user. In addition, the UE may determine a start time of a transmission window of the RMSI and a start time of a transmission window of the paging message in a manner specified in the protocol. For example, the start time of the transmission window of the RMSI is carried in some fixed frames, subframes, or slots; and the start time of the transmission window of the paging message may be calculated by the UE based on a UE ID and/or a paging parameter broadcast in the system information. Finally, the UE calculates, based on an obtained location relationship between the transmission window and a transmission subwindow in which a downlink transmit beam is located, the scheduling length, and the start time of the transmission window, a time in which the transmission subwindow is located, and receives a broadcast signal in the time, thereby avoiding a waste of detection power consumption.

Figure 7:
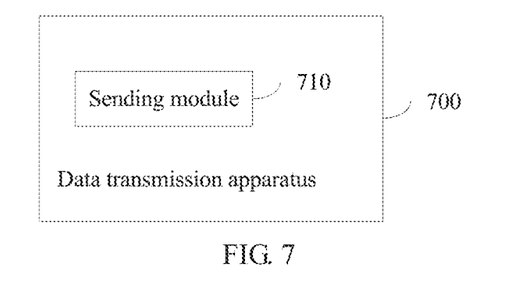
FIG. 7 is a schematic structural diagram of a data transmission apparatus.

Corresponding to the foregoing method embodiment parts, an embodiment of this application further provides a data transmission apparatus. FIG. 7 is a schematic structural diagram of a data transmission apparatus according to an embodiment of this application. Specifically, the data transmission apparatus 700 includes: a sending module 710, configured to send, in each transmission subwindow corresponding to a broadcast signal, the broadcast signal to UE by using a different antenna port.

The transmission subwindow is obtained by dividing, based on preset subwindow information, a transmission window corresponding to the broadcast signal.

In an implementation, the transmission subwindow may be obtained by evenly dividing the transmission window.

In another implementation, the subwindow information includes a subwindow length and a start time, and the transmission subwindow may be obtained by sequentially and consecutively dividing the transmission window based on the subwindow length and the start time.

In another implementation, the transmission subwindow may be obtained by dividing at least two adjacent transmission windows.

In another implementation, the at least two adjacent transmission windows include a first transmission window and a second transmission window, and the transmission subwindow includes a transmission subwindow that is obtained by concatenating a remaining part of time of the first transmission window and a start part of time of the second transmission window.

The broadcast signal may include remaining minimum system information RMSI, other system information OSI, or a paging message.

Figure 8:
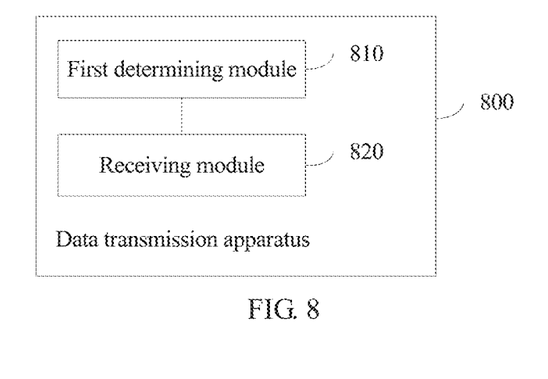
FIG. 8 is a schematic structural diagram of another data transmission apparatus.

In addition, an embodiment of this application further provides a data transmission apparatus. FIG. 8 is a schematic structural diagram of another data transmission apparatus according to an embodiment of this application. The data transmission apparatus 800 includes: a first determining module 810, configured to determine a transmission subwindow in which a downlink transmit beam is located, where the transmission subwindow is obtained by dividing a transmission window corresponding to a preset broadcast signal; and a receiving module 820, configured to receive the broadcast signal in a time in which the transmission subwindow is located, where the time in which the transmission subwindow is located is calculated based on pre-obtained subwindow information.

In an implementation, the broadcast signal includes a synchronization signal block, and the first determining module includes: a first obtaining module, configured to detect a synchronization signal block set, to obtain an index of a synchronization signal block sent by using the downlink transmit beam, where the synchronization signal block set includes a synchronization signal block having an index; and a second determining module, configured to: determine, based on a preset correspondence between an index of a synchronization signal block and a transmission subwindow, a transmission subwindow corresponding to the index of the synchronization signal block, and use the transmission subwindow as the transmission subwindow in which the downlink transmit beam is located.

Specifically, the subwindow information includes a subwindow length and a start time, and the apparatus further includes: a second obtaining module, configured to obtain a location relationship between the transmission window and the transmission subwindow in which the downlink transmit beam is located; and a calculation module, configured to calculate, based on the location relationship, the subwindow length, and the start time, the time in which the transmission subwindow is located.

In an implementation, the subwindow length is delivered by a base station.

Figure 9:
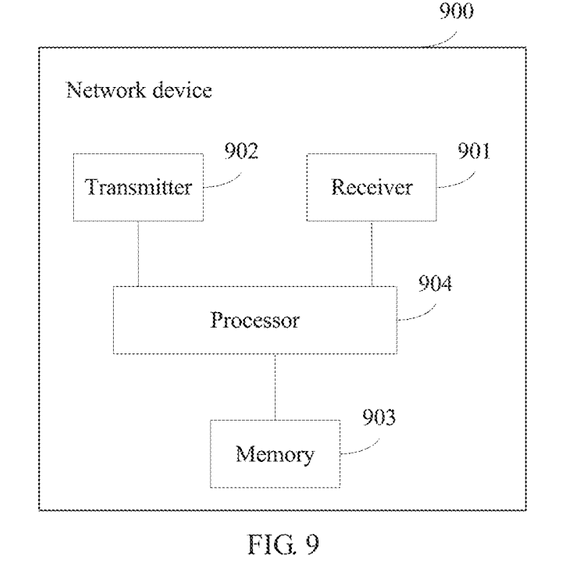
FIG. 9 is a schematic structural diagram of hardware of a network device.

FIG. 9 is a schematic structural diagram of hardware of a network device according to an embodiment of this application. The network device 900 includes a receiver 901, a transmitter 902, a memory 903, and a processor 904. The memory 903 is configured to store a group of instructions. When the processor 904 executes the instructions, the transmitter 902 is enabled to send, in each transmission subwindow corresponding to a broadcast signal, the broadcast signal to user equipment UE by using a different antenna port. The transmission subwindow is obtained by dividing, based on preset subwindow information, a transmission window corresponding to the broadcast signal.

In an implementation of the present invention, the transmission subwindow may be obtained by evenly dividing the transmission window.

In an implementation of the present invention, the subwindow information includes a subwindow length and a start time, and the transmission subwindow may be obtained by sequentially and consecutively dividing the transmission window based on the subwindow length and the start time.

In an implementation of the present invention, the transmission subwindow may be obtained by dividing at least two adjacent transmission windows.

In an implementation of the present invention, the at least two adjacent transmission windows include a first transmission window and a second transmission window, and the transmission subwindow may include a transmission subwindow that is obtained by concatenating a remaining part of time of the first transmission window and a start part of time of the second transmission window.

In an implementation of the present invention, the broadcast signal includes remaining minimum system information RMSI, other system information OSI, or a paging message.

In some implementations, the processor 904 may be a central processing unit (CPU), the memory 903 may be an internal memory of a random access memory (RAM) type, the receiver 901 and the transmitter 902 may include, for example, a common physical interface, and the physical interface may be an Ethernet interface or an asynchronous transfer mode (ATM) interface. The receiver 901 is configured to support a receiving function of the network device, and the transmitter 902 is configured to support a sending function of the network device. The processor 904, the receiver 901, the transmitter 902, and the memory 903 may be integrated into one or more independent circuits or hardware, for example, an application-specific integrated circuit (ASIC). The processor 904 and another component may be connected as shown in the figure, or may be connected by using a bus architecture. The processor 904 may be configured to support the network device in implementing the functions described in the foregoing method embodiments. The receiver 901 and the transmitter 902 may be independently disposed, or may be integrated together. The receiver 901 and the transmitter 902 may also be integrated together with the processor. For example, in some implementations, a sending unit (or a transmitter circuit, an output unit, or an output circuit) in the processor 904 may be considered as a transmitter, and a receiving unit (or a receiver circuit, an input unit, or an input circuit) in the processor may be considered as a receiver. Alternatively, a sending unit and/or a receiving unit in the processor is considered as a transceiver.

Figure 10:
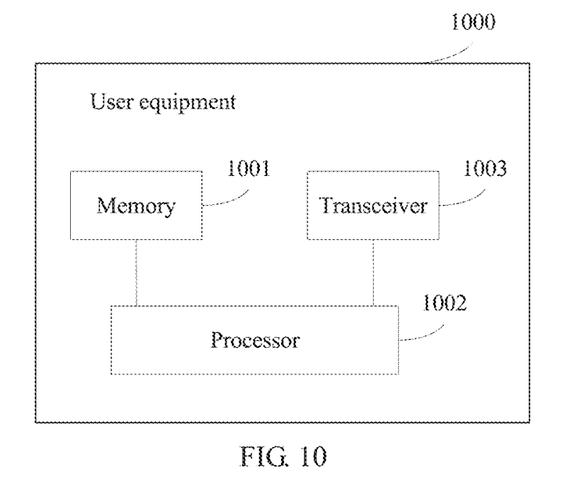
FIG. 10 is a schematic structural diagram of hardware of user equipment.

FIG. 10 is a schematic structural diagram of hardware of user equipment according to an embodiment of this application. The user equipment 1000 includes a memory 1001, a processor 1002, and a transceiver 1003. The transceiver 1003 is configured to implement a transceiving function of the user equipment, and the processor 1002 may be configured to support the user equipment in implementing the functions described in the foregoing method embodiments. For example, the processor 1002 may include a receiving unit and/or a sending unit, to support the user equipment in implementing a receiving function and/or a sending function. The transceiver 1003 may be separately disposed. Alternatively, the transceiver 1003 may be integrated into the processor. For example, in some implementations, a receiving (or input) unit (or circuit) and/or a sending (or output) unit (or circuit) in the processor may be considered as a transceiver.

The memory 1001 is configured to: store program code, and transmit the program code to the processor 1002.

The processor 1002 is configured to determine a transmission subwindow in which a downlink transmit beam is located. The transmission subwindow is obtained by dividing a transmission window corresponding to a preset broadcast signal.

The transceiver 1003 is configured to receive the broadcast signal in a time in which the transmission subwindow is located. The time in which the transmission subwindow is located is calculated based on pre-obtained subwindow information.

In an implementation of the present invention, the broadcast signal includes a synchronization signal block.

The processor 1002 is specifically configured to: detect a synchronization signal block set, to obtain an index of a synchronization signal block sent by using the downlink transmit beam, where the synchronization signal block set includes synchronization signal blocks sent by using different downlink transmit beams, and each synchronization signal block has an index; determine, based on a preset correspondence between an index of a synchronization signal block and a transmission subwindow, a transmission subwindow corresponding to the index of the synchronization signal block; and use the transmission subwindow as the transmission subwindow in which the downlink transmit beam is located.

In an implementation of the present invention, the subwindow information includes a subwindow length and a start time.

The processor 1002 is further configured to: obtain a location relationship between the transmission window and the transmission subwindow in which the downlink transmit beam is located, and calculate, based on the location relationship, the subwindow length, and the start time, the time in which the transmission subwindow is located.

In an implementation of the present invention, the subwindow length is delivered by a base station.

In some implementations, the processor 1002 may be a central processing unit (CPU), the memory 1001 may be an internal memory of a random access memory (RAM) type, the transceiver 1003 may include a common physical interface, and the physical interface may be an Ethernet interface or an asynchronous transfer mode (ATM) interface. The processor 1002, the transceiver 1003, and the memory 1001 may be integrated into one or more independent circuits or hardware, for example, an application-specific integrated circuit (ASIC). The processor 1002 and another component may be connected as shown in the figure, or may be connected by using a bus architecture.

An embodiment of this application provides a computer readable storage medium, including an instruction. When the instruction is run on a computer, the computer is enabled to perform the data transmission method performed by the foregoing network device.

An embodiment of this application further provides a computer readable storage medium, including an instruction. When the instruction is run on a computer, the computer is enabled to perform the data transmission method performed by the foregoing UE.

An embodiment of this application further provides a computer program product including an instruction. When the instruction is run on a computer, the computer is enabled to perform the data transmission method performed by the foregoing network device.

An embodiment of this application further provides another computer program product including an instruction.

When the instruction is run on a computer, the computer is enabled to perform the data transmission method performed by the foregoing UE.

All or some of the foregoing embodiments may be implemented by using software, hardware, firmware, or any combination thereof. When being implemented by using the software, all or some of the embodiments may be implemented in a form of a computer program product.

The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It may be clearly understood by a person skilled in the art that, for convenient and brief description, for a corresponding process in the foregoing method embodiments, refer to a specific working process of the foregoing system, apparatus, and unit. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, rather than limiting this application.

The invention claimed is:

1. A method comprising:
receiving a synchronization signal block;
determining, based on an index of the synchronization signal block, a transmission subwindow corresponding to a physical downlink control channel (PDCCH), wherein the transmission subwindow is one of multiple transmission subwindows, wherein a quantity of the multiple transmission subwindows is configured by a physical broadcast channel (PBCH), wherein a length of each of the multiple transmission subwindows is the same, wherein the length of each of the multiple transmission subwindows is predefined, and wherein any two adjacent transmission subwindows of the multiple transmission subwindows in the time domain are consecutive; and
receiving the PDCCH in the transmission subwindow.

2. The method according to claim 1, wherein the multiple transmission subwindows are distributed in two or more adjacent frames.

3. The method according to claim 1, wherein the quantity of the multiple transmission subwindows is less than or equal to a quantity of synchronization signal blocks in a synchronization signal block set.

4. The method according to claim 1, wherein the synchronization signal block and the PDCCH are received using a same beam.

5. The method according to claim 1, wherein each of the multiple transmission subwindows being a period of time for monitoring a second PDCCH, wherein all the multiple transmission subwindows are comprised in two adjacent frames, at least one transmission window of the two adjacent frames comprises at least two transmission subwindows, and wherein different transmission subwindows in the two adjacent frames correspond to different indexes of synchronization signal blocks.

6. An apparatus, comprising:
at least one processor, wherein the at least one processor is configured to execute instructions to cause the apparatus to perform:
receiving a synchronization signal block;
determining, based on an index of the synchronization signal block, a transmission subwindow corresponding to a physical downlink control channel (PDCCH), wherein the transmission subwindow is one of multiple transmission subwindows, wherein a quantity of the multiple transmission subwindows is configured by a physical broadcast channel (PBCH), wherein a length of each of the multiple transmission subwindows is the same, wherein the length of each of the multiple transmission subwindows is predefined, and wherein any two adjacent transmission subwindows of the multiple transmission subwindows in the time domain are consecutive; and
receiving the PDCCH in the transmission subwindow.

7. The apparatus according to claim 6, wherein the multiple transmission subwindows are distributed in two or more adjacent frames.

8. The apparatus according to claim 6, wherein the quantity of the multiple transmission subwindows is less than or equal to a quantity of synchronization signal blocks in a synchronization signal block set.

9. The apparatus according to claim 6, wherein the receiving the PDCCH in the transmission subwindow comprises:
receiving the synchronization signal block and the PDCCH using a same beam.

10. The apparatus according to claim 6, wherein each of the multiple transmission subwindows being a period of time for monitoring a second PDCCH, wherein all the multiple transmission subwindows are comprised in two adjacent frames, at least one transmission window of the two adjacent frames comprises at least two transmission subwindows, and wherein different transmission subwindows in the two adjacent frames correspond to different indexes of synchronization signal blocks.

11. An apparatus, comprising:
at least one processor, wherein the at least one processor is configured to execute instructions to cause the apparatus to perform:
sending a synchronization signal block; and
sending a physical downlink control channel (PDCCH) in a transmission subwindow corresponding to the synchronization signal block, wherein the transmission subwindow is one of multiple transmission subwindows, wherein a quantity of the multiple transmission subwindows is configured by a physical broadcast channel (PBCH), wherein a length of each of the multiple transmission subwindows is the same, wherein the length of each of the multiple transmission subwindows is predefined, and wherein any two adjacent transmission subwindows of the multiple transmission subwindows in the time domain are consecutive.

12. The apparatus according to claim 11, wherein the multiple transmission subwindows are distributed in two or more adjacent frames.

13. The apparatus according to claim 11, wherein the quantity of the multiple transmission subwindows is less than or equal to a quantity of synchronization signal blocks in a synchronization signal block set.

14. The apparatus according to claim 11, wherein the synchronization signal block and the PDCCH are sent using a same beam.

15. The apparatus according to claim 11, wherein each of the multiple transmission subwindows being a period of time for monitoring a second PDCCH, wherein all the multiple transmission subwindows are comprised in two adjacent frames, at least one frames of the two adjacent frames comprises at least two transmission subwindows, and wherein different transmission subwindows in the two adjacent frames correspond to different indexes of synchronization signal blocks.

16. An apparatus, comprising:
at least one processor, wherein the at least one processor is configured to execute instructions to cause the apparatus to perform:
sending a synchronization signal block; and
sending a physical downlink control channel (PDCCH) in a transmission subwindow corresponding to the synchronization signal block, wherein the transmission subwindow is one of n transmission subwindows, each of the n transmission subwindows being a period of time for monitoring a PDCCH, wherein all the n transmission subwindows are comprised in two adjacent transmission windows, wherein at least one transmission window of the two adjacent transmission windows comprises at least two transmission subwindows, wherein n is an integer greater than 2, and wherein different transmission subwindows in the two adjacent transmission windows correspond to different indexes of synchronization signal blocks.

17. The apparatus according to claim 16, wherein n is less than or equal to a quantity of synchronization signal blocks in a synchronization signal block set.

18. The apparatus according to claim 16, wherein the synchronization signal block and the PDCCH are sent by using a same beam.

19. The apparatus according to claim 16, wherein a length of each of the n transmission subwindows is the same, wherein the length of each of the n transmission subwindows is predefined, wherein any two adjacent transmission subwindows of the n transmission subwindows in the time domain are consecutive.

20. The apparatus according to claim 16, wherein each of the two adjacent transmission windows is a frame.

\* \* \* \* \*

UNITED STATES PATENT AND TRADEMARK OFFICE
CERTIFICATE OF CORRECTION

| | |
|---|---|
| PATENT NO. | : 11,824,697 B2 |
| APPLICATION NO. | : 17/666313 |
| DATED | : November 21, 2023 |
| INVENTOR(S) | : Li et al. |

It is certified that error appears in the above-identified patent and that said Letters Patent is hereby corrected as shown below:

In the Claims

In Column 24, in Claim 15, Line 10, delete "one frames" and insert -- one frame --.

Signed and Sealed this
Sixth Day of February, 2024

Katherine Kelly Vidal
*Director of the United States Patent and Trademark Office*